March 30, 1926. 1,578,689
J. P. SPILGER
MOWING MACHINE
Filed May 18, 1925
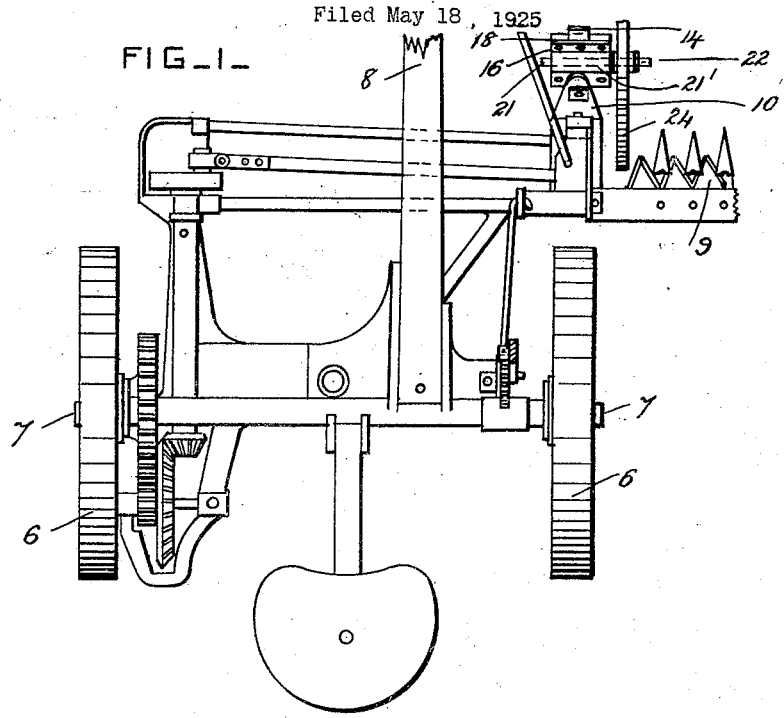
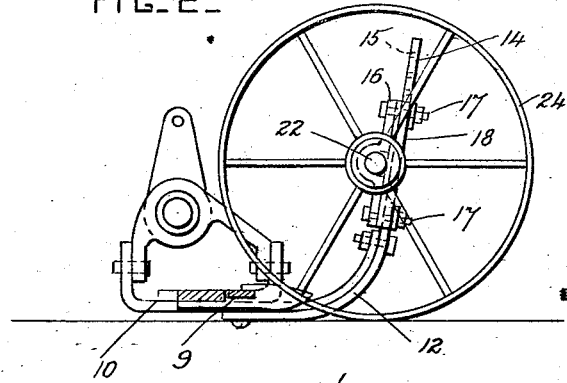
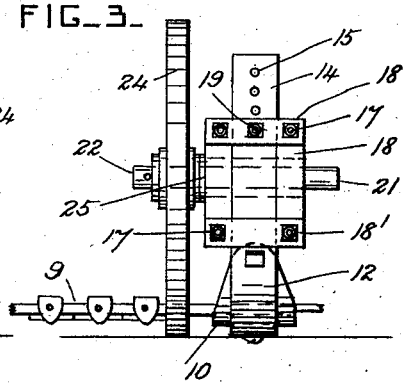
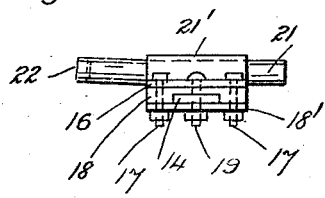
Inventor
John P. Spilger
by Herbert W. Jenner
Attorney Patented Mar. 30, 1926.

1,578,689

UNITED STATES PATENT OFFICE.

JOHN P. SPILGER, OF REYNOLDS, ILLINOIS.

MOWING MACHINE.

Application filed May 18, 1925. Serial No. 31,008.

*To all whom it may concern:*

Be it known that I, JOHN P. SPILGER, a citizen of the United States, residing at Reynolds, in the county of Rock Island and State of Illinois, have invented certain new and useful Improvements in Mowing Machines, of which the following is a specification.

This invention relates to wheeled mowing machines provided with reciprocating cutter bars, as ordinarily used for cutting clover and grass; and it consists in a wheeled attachment to the front part of the inner shoe which supports the cutter bar, constructed as hereinafter fully described and claimed, and operating to prevent the cutter bar from clogging when cutting a heavy crop.

In the drawings, Figure 1 is a plan view showing an outline of a mowing machine, and an attachment constructed according to this invention. Fig. 2 is a side view of the inner shoe and the attachment, and is drawn to a larger scale. Fig. 3 is a front view of the parts shown in Fig. 2. Fig. 4 is a plan view of the slide.

The mowing machine is of any approved make provided with a reciprocating cutter bar, as exemplified in the patent to J. W. Pridmore, No. 596,542, dated Jan. 4, 1898. The ground wheels 6 are mounted on an axle 7, and the machine is drawn along by a draft pole 8. The cutter bar 9 is arranged to one side of the machine in front of the ground wheels, and one end of it is supported by the inner shoe 10 which runs on the ground and all other parts of the machine are constructed and operated in any approved way.

Mowing machines of this sort have trouble in cutting a heavy crop of clover, as the divider has difficulty in dividing the crop, particularly after the first round. The clover then begins to gather and drag at the inner shoe, and the machine clogs up so that the team cannot move it. It is then necessary to back up and clean out, and this leaves the last cut clover in bunches which do not cure evenly with the rest of the crop. In an ordinary mowing machine the mower shoe can be raised and lowered, but no means are provided for holding it at a predetermined minimum distance above the ground independently of the devices for raising and lowering it.

According to this invention, a curved bar or plate 12 is bolted to the underside of the inner shoe 10, and has a straight portion or upright 14 which projects upwardly at the front end of the shoe. This upright has a vertical series of holes 15 in it. A bracket 16 is arranged to the rear of and is clamped by bolts 17 to a slide 18, adjustable vertically on the upright. The slide is formed of a channel-shaped rear portion, and crossplates 18' which extend across the front of the upright and are secured to the rear portion by the bolts 17. The height of this bracket above the ground is adjusted by sliding the slide on the upright, and the bracket is locked to the upright by a bolt 19 which engages with holes in the slide, and with any one of the holes 15.

A shaft 21 is mounted in a loop-shaped bearing 21' on the bracket, and is adjustable longitudinally in it, and is clamped in place by tightening the clamping bolts 17 after its position has been adjusted. The projecting portion of the shaft 21 forms a stub axle 22 upon which a ground wheel 24 is loosely journaled. The stub axle 22 is set at a slight angle to the shaft 21 to make the wheel 24 run true with the main ground wheels 6, and washers 25 are placed between the hub and the bearing when the wheel is moved away from the bearing. The position of the wheel 24 is adjusted vertically so that it runs lightly on the ground, and restricts the downward movement of the cutter bar. The position of the wheel can be adjusted as often as necessary without unclamping the stub shaft, and without materially tilting the guard fingers of the cutter bar. When a mowing machine is provided with this attachment a full swath can be cut around a field in a heavy crop of clover, without having to stop and free the cutter bar.

What I claim is:

1. An attachment for a mowing machine provided with an inner shoe for running on the ground, and a cutter bar supported by the said shoe; said attachment comprising a bar having a curved portion between its ends, a straight upright forming one end portion of the bar, and means for securing its other end portion to the said inner shoe, an adjustable slide mounted on the said upright, a bracket provided with a loop-shaped bearing, a stub axle arranged in the loop-shaped bearing, means for securing the said bracket to the slide and clamping the stub axle between it and the slide, and a ground wheel mounted on one end portion of the stub axle and arranged in front of the cutter bar.

2. An attachment for a mowing machine provided with an inner shoe which runs on the ground, and a cutter bar supported thereby; said attachment comprising a curved bar adapted to be bolted to the inner shoe and having an upright adapted to project upwardly in advance of the inner shoe, a slide adjustable vertically on the said upright and provided with means for securing it when adjusted, a stub axle carried by the said slide and adapted to project horizontally in front of the cutter bar, and a ground wheel journaled on the said stub axle.

In testimony whereof I have affixed my signature.

JOHN P. SPILGER.